UNITED STATES PATENT OFFICE 2,523,336

COMPOSITION FOR ELECTRICAL DISTRIBUTORS AND IGNITION PARTS

Paul C. Schroy, Rochester, N. Y., and Joseph Grabowski, Stamford, Conn., assignors to American Cyanamid Company, New York, N. Y., a corporation of Maine No Drawing. Application November 14, 1945, Serial No. 628,677

5 Claims. (Cl. 200—19)

This invention relates to the production of compositions containing melamine resins with phenolic resins and, more particularly, in such proportions as to exhibit outstanding properties not previously attained.

This application is a continuation in part of application Serial No. 421,485, filed December 3, 1941, now abandoned.

In the general application of synthetic resins, it has developed that each of the various types has properties making it suitable for relatively specific uses. However, in virtually each case, the resins are lacking in some respects which prevents their general use. This applies to the individual resins as well as to combinations of the various compatible types. Especially is this true in the electrical field where it is essential that the resinous product have not only the necessary electrical properties, good heat resistance but also good water resistance and dimensional stability. Since most moldings used for electrical purposes require the inclusion of metal inserts, any undue amount of after-shrinkage causes a loosening of the inserts and consequent failure of the molding.

It is the main object of the present invention to provide a resin composition having excellent electrical properties when molded and, at the same time, having the desired stability against heat, water and shrinkage.

This and other objects are attained by blending with a melamine resin, relatively smaller amounts of phenol resins. In general, we combine about 95% down to about 50% of melamine-formaldehyde resin with about 5% up to about 50% of phenolic resin.

The following examples, in which parts are by weight, are given for purposes of illustration and not in limitation. The zinc stearate used in the examples may be omitted or replaced in whole or in part by other mold lubricants.

Example 1

112 parts melamine-formaldehyde resin A (molar ratio 1:2)
48 parts cresol-formaldehyde resin B (molar ratio 1:0.85)
240 parts chrysotile asbestos (heat-treated)
4 parts zinc stearate The resins are separately prepared as relatively fine-ground powders. The asbestos used has preferably been heated at about 1200° F. for about 30 minutes. The mixture of the materials listed is blended and compounded on hot differential rolls. After the desired degree of compounding is obtained, the relatively thin sheets or flakes coming off the rolls are cooled and broken up to pass a ⅛ inch screen. This product is suitable as a molding composition.

Molded articles are prepared by subjecting the molding composition to a molding operation in a desired mold at a temperature of about 150°–160° C. for about 5–10 minutes under a pressure of about 3000 lbs./square inch. This material may also be molded by the so-called "transfer molding" technique.

Example 2

96 parts melamine-formaldehyde resin A
64 parts xylenol-formaldehyde resin C (molar ratio 1:0.82)
240 parts asbestos (heat-treated)
4 parts zinc stearate This composition is mixed and compounded on hot rolls in the same manner as described in Example 1, to give a molding composition.

Example 3

112 parts melamine-formaldehyde resin A
48 parts phenol-formaldehyde resin D (molar ratio 1:1)
240 parts asbestos (heat-treated)
4 parts zinc stearate This composition is mixed and compounded on hot rolls as described in Example 1 whereby a molding composition is obtained.

Example 4

112 parts melamine-formaldehyde resin A
48 parts phenol-formaldehyde resin E
240 parts asbestos (heat-treated)
4 parts zinc stearate This composition is compounded on hot rolls as described in Example 1 to produce a molding composition.

Similar molded articles were prepared from each of the molding compositions described above and the molded products were compared with each other and with similar moldings made from similar molding compositions prepared with straight melamine-formaldehyde resin A and with straight phenol-formaldehyde resin E, the several moldings having the following characteristics:

| Molding Compound | Arc Resistance ASTM sec. | Dielectric Strength (v./mil) | | Shrinkage (8 hrs. at 220° F.), mils/in. | Arc Resistance after 8 hrs. at 400° F. |
| --- | --- | --- | --- | --- | --- |
| | | 100° C. | 25° C. | | |
| Example 1 | 169 | 368 | 442 | 2.5 | 186 |
| Example 2 | 136 | 365 | 380 | 2.4 | 152 |
| Example 3 | 160 | 280 | 386 | 3.1 | |
| Example 4 | 170 | 279 | 407 | 3.5 | 186 |
| Melamine-formaldehyde | 190 | 303 | 412 | 5.5 | |
| Phenol-formaldehyde | 71 | 220 | 355 | 2.0 | |

*Preparation of melamine-formaldehyde resin A*

In a typical example of this resin, 63 parts of melamine and 85 parts of Formalin (40% by volume) are heated to reflux at a pH of 6.8 (bromthymol-blue) obtained with sodium hydroxide. The resin syrup is then cooled to 75° C. and maintained at this temperature until it shows slight hydrophobity on adding a few drops to ice water. At this hydrophobe point, the pH is adjusted to 8.3 (thymol blue). Following this, the syrup is concentrated at a vacuum of 20½ inches of mercury until the temperature reaches 115° C., whereupon the resin is withdrawn from the kettle to cool. The cooled resin is ground to a fine powder. An amine or other alkali in place of the caustic soda may be used.

While resin A is prepared in the molar ratio of 1:2, similar suitable resins may be prepared in a like manner from any suitable combining ratios of melamine to formaldehyde from 1:2 to 1:6 or even higher.

*Preparation of cresol-formaldehyde resin B*

To 318 parts cresol are added 202.5 parts Formalin (37.5% formaldehyde by weight) and 0.9 part sulfuric acid (95.5%) in 22.5 parts water and the mixture is heated to reflux in ½ hour. Refluxing is continued for 45 minutes after which the product is concentrated under vacuum until a vacuum of 27½ inches of mercury and a temperature of 118° C. is reached. 0.9 part of freshly slaked lime is added during the concentration period. Upon allowing the syrup to cool, a clear, friable resin is obtained which is ground to a fine powder.

*Preparation of xylenol-formaldehyde resin C*

To 350 parts of xylenol are added 197.5 parts of Formalin (37.5% formaldehyde by weight) and 0.7 part of sulfuric acid (95.5%) in 17.5 parts of water. The mixture is heated to reflux in 30 minutes and held at reflux for 90 minutes after which the product is concentrated under vacuum until a vacuum of 27½ inches of mercury and a temperature of 118° C. is reached. 0.7 part of freshly slaked lime is added during the concentration period. Upon cooling, a clear, friable resin is obtained which is ground to a fine powder.

*Preparation of phenol-formaldehyde resin D*

To 330 parts phenol are added 284 parts Formalin (37% formaldehyde by weight) and 24.5 parts ammonium hydroxide (28%). The mixture (pH 7.05—glass electrode) is heated to reflux in ½ hour and held at reflux for 45 minutes. The product is cooled to 65° C. in 10 minutes and is subjected to vacuum concentration at a vacuum of 20½ inches of mercury which after 105 minutes is increased 28 inches for an additional 10 minutes. The syrup, on cooling, forms a brittle resin which is powdered.

*Preparation of phenol-formaldehyde resin E*

To 94 parts of phenol are added 67 parts of Formalin (37% formaldehyde by weight) and 0.6 part of sulfuric acid (95.5%) in about 15 parts of water and the mixture is heated to reflux in ½ hour. Refluxing is continued for 45 minutes after which the product is concentrated under vacuum until a vacuum of about 21 inches of mercury is reached. About 0.9 part of freshly slaked lime is added during the concentration. When substantially dehydrated, the resin is cast, cooled and ground to a fine powder.

In our molding compositions the resinous portion is made up of more than 50% melamine resin and preferably at least about 60% of melamine and the rest is phenolic resin, at least 5% of the latter being required for good heat resistance, good electrical properties and good shrinkage properties. The relative proportions of the two resins vary somewhat with the molecular weight of the phenol employed. About 30% of phenol-formaldehyde resin and about 70% of melamine resin gives a composition having excellent characteristics. On the other hand, about 35% of the cresol-formaldehyde resins mixed with about 65% of melamine-formaldehyde resins gives the composition having optimum properties. About 40% xylenol-formaldehyde resin mixed with about 60% of melamine-formaldehyde resin gives a composition having very excellent electrical properties. The optimum electrical properties may be associated with the phenolic hydroxyl content of the resin. Thus with 30% of phenolic resins there is about 5.4% of phenolic hydroxyl, with 35% of cresol resin there is about 5.2% of phenolic hydroxyl and with 40% of xylenol resin there is about 5.5% of hydroxyl. Accordingly, optimum electrical properties are obtained with compositions containing between about 5% and 5.5% of phenolic hydroxyl.

If the proportions of phenolic resin are higher than the optimums mentioned above, the arc resistance falls off markedly. Furthermore the arc resistance improves with the higher homologs. On the other hand, the heat resistance falls off with the higher homologs.

Products produced according to our invention have excellent heat resistance especially at 400° F., at which point they are far superior to the ordinary mineral-filled phenolic resins.

If desired, the phenolic resin portion of our compositions may include several types of phenols e. g. mixtures of two or more of the phenols simultaneously reacted with formaldehyde or mixtures of one or more of the phenolic resins described above. The curing of our molding compositions can be influenced by the addition of alkaline materials.

The fillers which are incorporated in the molding compositions may also be varied in that part or all of the asbestos may be replaced by wood meal, wood flour, cotton flock, alpha cellulose, mica, glass fibers, and other fibrous or mineral fillers or mixtures thereof. The fillers may be in woven or otherwise fabricated form.

The molding compositions of the present invention are especially valuable for making molded parts for motor magnetos, distributors and other ignition parts to replace the more commonly used hard rubber which lacks heat resistance or the molded phenolic compositions which lack arc resistance. It has been found that electrical distributors molded from our compositions give excellent results when used in various types of internal combustion engines particularly, those used in aeroplane engines and tractor engines. In such applications "tracking" which occurs in most cases with other plastics occurs to only a very limited extent and usually not at all. Terminal blocks which were previously made from various compositions with generally unsatisfactory results can now be hot molded with the instant compositions by the use of heat and pressure to give products having high dielectric properties and good dimensional stability.

Our resins can be spread on any carrier of inorganic or organic nature such as for instance on paper, asbestos paper, canvas, asbestos cloth, glass cloth, mixed cotton and glass cloth, etc. and either shaped into laminated base compositions such as plates or tubes or into moldings of relatively simple shape. Furthermore, pieces of these carriers covered with our resin compositions may be used alone as described and also may be used in conjunction with molding compositions on parts where added strength is required, such molding compositions being of a compatible nature.

Any of the cresols or any of the xylenols, or any mixtures thereof, may be used to prepare the phenolic resins employed in accordance with the foregoing description. The cresol employed is the conventional cresol used commercially, and it is a mixture including all of the isomers of cresol and sold as "Resin Cresol No. 8" by the Barrett Company and, according to the manufacturer it contains approximately 5% of o-cresol, 45% of m-cresol, 30% of p-cresol, 3% of phenol and 17% of xylenols. A commercial product substantially free of o-cresol and containing substantially only m-cresol and p-cresol (equal proportions ±10%) gives somewhat improved results.

It will be obvious that other changes and variations may be made in carrying out the present invention without departing from the spirit and scope thereof as defined in the appended claims.

We claim:

1. An electrical distributor housing adapted for use in the ignition system of an internal combustion engine comprising a melamine resin and a phenol resin, the melamine resin being present in an amount of about 95%–50%, and the phenolic resin being present in an amount of 5%–50%, the percentages being based on the total weight of said resins.

2. In an ignition system for an internal combustion engine an electrical conductor having a housing around it, said housing being a molding comprising a melamine resin and a phenol resin, the melamine resin being present in an amount of about 95%–50%, and the phenol resin being present in an amount of about 5%–50%, the percentages being based on the total weight of said resins.

3. An electrical conductor adapted to carry high tension electric current and contained in a housing molded of a composition comprising a melamine-formaldehyde resin, a phenolic resin and a filler, the melamine resin being present in an amount of about 95%–50%, and the phenolic resin being present in an amount of 5%–50%, the percentages being based on the total weight of said resins.

4. In an internal combustion engine an electrical distributor in the ignition system thereof, said distributor having a molded housing comprising a melamine-formaldehyde resin and a phenolic-formaldehyde resin, the melamine resin being present in an amount of about 95%–50% and the phenolic resin being present in an amount of about 5%–50%, the percentages being based on the total weight of said resins.

5. An electrical distributor housing as in claim 1 wherein said phenol resin is a cresol-formaldehyde resin.

PAUL C. SCHROY.
JOSEPH GRABOWSKI.

REFERENCES CITED

The following references are of record in the file of this patent:

UNITED STATES PATENTS

| Number | Name | Date |
|---|---|---|
| 2,064,052 | Arthur | Dec. 15, 1936 |
| 2,365,925 | Zoerlein et al. | Dec. 26, 1944 |
| 2,388,293 | Schroy | Nov. 6, 1945 |